United States Patent [19]
Lemery

[11] 3,718,291
[45] Feb. 27, 1973

[54] FISHING REEL

[75] Inventor: Jean-Paul Lemery, Cluses, France

[73] Assignee: Carpano & Pons, Cluses, France

[22] Filed: April 9, 1971

[21] Appl. No.: 132,826

Related U.S. Application Data

[63] Continuation of Ser. No. 786,703, Dec. 24, 1968, abandoned.

[30] Foreign Application Priority Data

Jan. 8, 1968 France.............................68135212

[52] U.S. Cl..............................242/219, 242/84.1 J
[51] Int. Cl................................................A01k 89/02
[58] Field of Search.........242/219, 218, 217, 84.5 R, 242/84.51 R, 84.1 J

[56] References Cited

UNITED STATES PATENTS

| | | | |
|---|---|---|---|
| 691,073 | 1/1902 | Rabbeth | 242/217 |
| 1,731,208 | 10/1929 | Adams | 242/84.5 R |
| 2,136,438 | 11/1938 | Horsrud | 242/217 |
| 2,646,939 | 7/1953 | Hirsch | 242/219 |
| 2,760,357 | 8/1956 | Burns | 64/1 |
| 3,085,766 | 4/1963 | Salmivuori | 242/219 X |

*Primary Examiner*—Billy S. Taylor
*Attorney*—Robert E. Burns

[57] ABSTRACT

A fishing reel comprises a spool mounted between two connected together flanges and a crank for turning the spool projects outwardly from one of the flanges, the crank is provided with a bell-shaped housing therein and a variably set torque limiting device interconnecting the crank and spool is disposed in the housing. The torque limiting device comprises a disc clutch assembly having a plurality of friction washers disposed between bearing surfaces connected to both the crank and a gear system for rotating the spool. The torque limiting device is variably set by the user to effect slippage therein at any desired torque value resulting in relative rotation between the crank and the spool. In addition, the torque limiting device is contained in a cartridge and is removably mounted in the fishing reel assembly.

9 Claims, 4 Drawing Figures

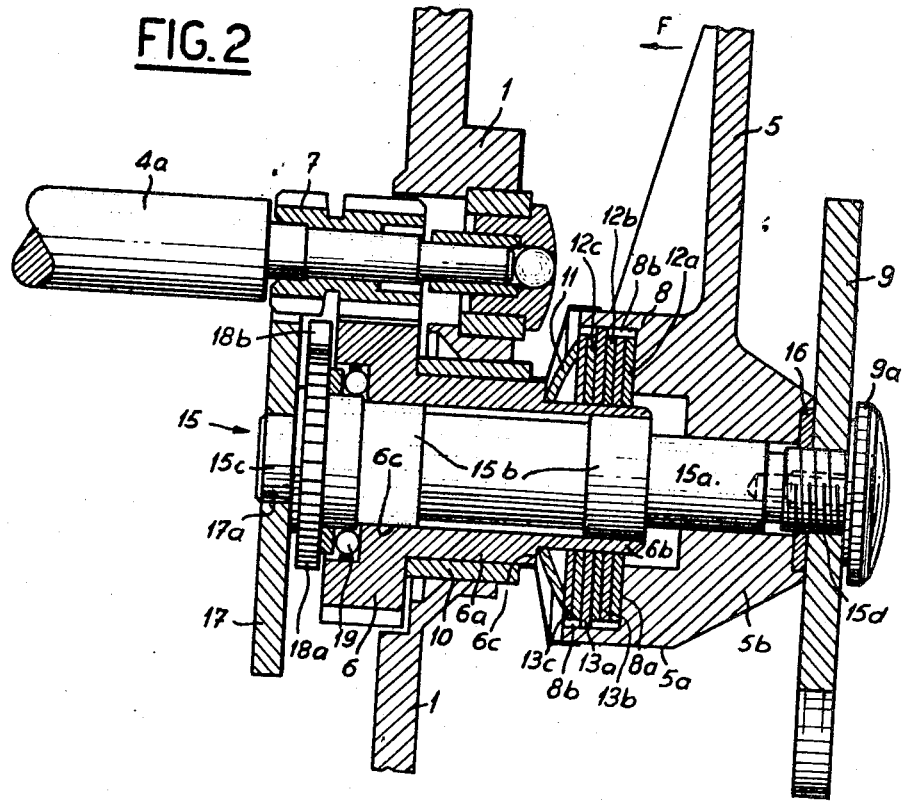
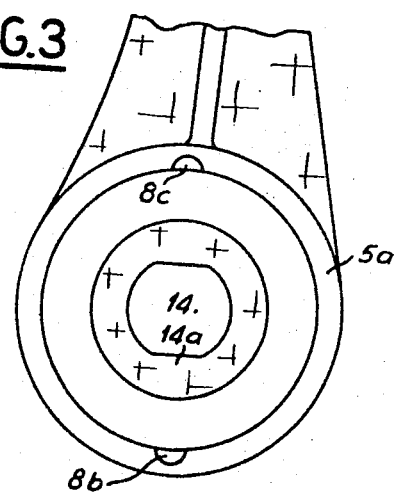

FISHING REEL

This application is a streamlined continuation of application Ser. No. 786,703 dated Dec. 24, 1968, now abandoned.

The present invention has for its object to provide a fishing reel comprising a spool rotatably mounted between two flanges fast one of the other, a crank for rotationally driving the spool projecting outwardly from one of the flanges, and a torque limiting device placed between the crank and the spool.

There are already known a large number of fishing reels of this type and in particular those having a construction corresponding to that described and shown in U.S. Pat. No. 2,055,448.

In such reels, the crank is integral with a sleeve pivoted on a shaft support and riveted by one end on a plate secured to the flange by screws in such a way that this sleeve and this shaft are cantilevered on the plate. In this construction, stresses communicated by the fisherman on the crank are thus supported exclusively by riveting of the shaft and the screws of the plate. Such a construction results in a considerable number of breakages of the various components without a practical possibility of repairing the reel, as well as unwanted disassembly of the fishing reel due to problems not always repairable.

Additionally in the same reels, the members forming the torque limiter, in particular the friction washers are integrated with the mechanism of the reel itself, it being in particular positioned in the flange carrying the crank.

This constructional feature engenders two important drawbacks. The first instance it is caused by the relatively reduced diameter which must be given to the pivoting axis of the crank and consequently to the riveting of this shaft from which follows a certain fragility in assembly if it is desired to dispose of an annular space which is sufficient for housing therein members of the limiting device despite the relatively reduced dimensions of the end flanges of the reel dictated by the desire to obtain as small as possible a device; other drawbacks reside in that these members are integrated to the mechanism itself which obliges the fisherman to disassemble the largest parts of the mechanism even when he only desires to replace the frictional washes of the torque limiting device.

Finally the relatively considerable and prolonged stresses to which the torque limiting device of such reels is subjected often leads to the heating of the part thereof and naturally of its control screw which may be sufficient to bother the fisherman.

The invention proposes to obviate the various above-mentioned drawbacks and the reel forming the subject thereof comprises a spool pivotally mounted between two flanges fast one of the other, a crank for turning the spool and projecting along the flanges and a torque limiting device placed between the crank and the spool, the reel being characterized by the fact that the components of the torque limiting device are positioned outside the flange of the crank in the opening of a bell shaped member integral with the latter.

According to another equally important characteristic of the invention and when the spool is rotated by the crank through a train of multiplicating gears, the flange of the crank carrying a rotary bearing the opening of which is pivoted the first gear of the train, the flank being integral in rotation with a shaft pivoted in the axial opening of this first gear and integral with the toothed tray of a pawl system forming a uni-directional blocking member for the handle and the torque limiting device is positioned between said first gear and this crank.

According to a further characteristic of the invention, the torque limiting device is formed by a series of friction washers pinched on both sides by bearing surfaces kinematically integral alternately with the crank and with the first gear of the train and by an adjustable clamping device for these surfaces on the washers.

According to a particularly advantageous characteristic of the invention, the handle is slidably mounted axially on the shaft and the clamping device comprises, on the one hand, a nut engaged on a threading of a shaft bearing on the crank and, on the other hand, at least one spring which opposes itself to the axial movement of the crank under the action of the nut.

According to a further characteristic of the invention, support of the nut on the handle is effected by means of a self-lubricating packing.

According to yet a further characteristic of the invention, the support of the nut on the crank is achieved by the intermediary of the thermal insulating packing.

In a particularly advantageous embodiment, the packing can be simultaneously self-lubricating and insulating.

Advantageously but not limitatively, a bearing forming an axial stop is mounted around the shaft between the first gear of the train and the pawl tray on which it bears.

Other characteristics and features of the invention will be described by referring to the accompanying drawings which are given in a non limiting fashion and in which:

FIG. 2 is a longitudinal cross-section of the mechanism for driving and breaking the reel illustrated in FIG. 1;

FIG. 3 is a cross-section taken along line III—III of FIG. 2;

Figure 1:
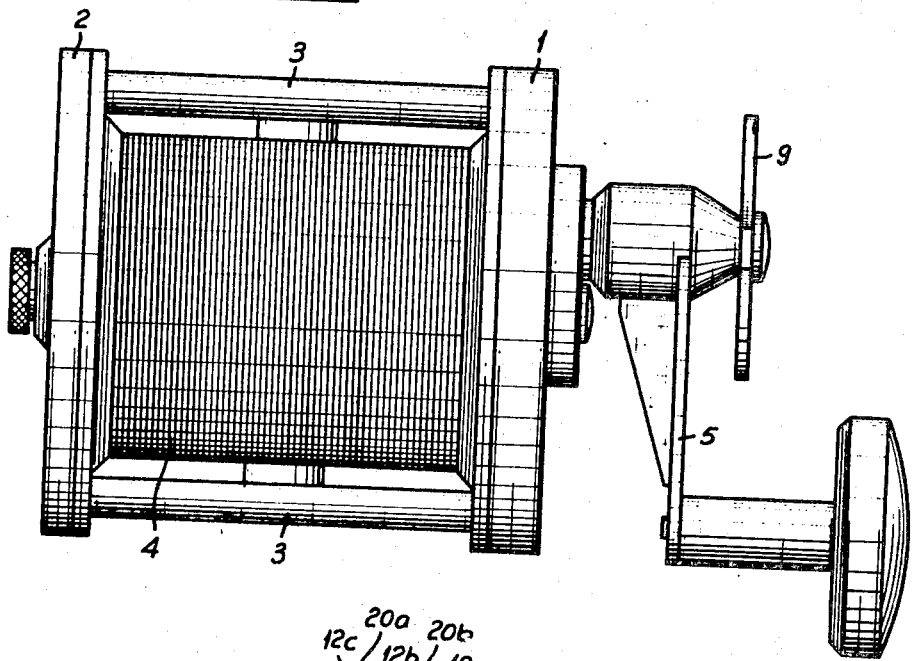
FIG. 1 is a plane view of the reel according to the invention.
Figure 4:
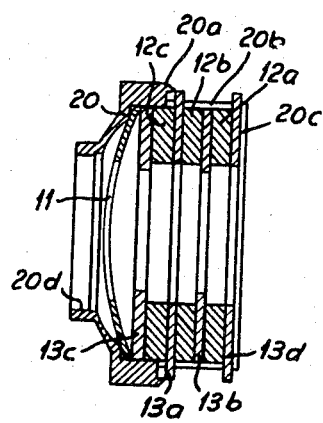
FIG. 4 is an axial cross-sectional view of a reel containing the friction washers.

The reel shown in the drawing (FIG. 1) comprises a frame equipped with two lateral flanges 1 and 2 connected by posts 3 between which is rotatably mounted a spool 4 which a crank or crank arm 5 allows driving manually through a multiplicating mechanism or gear system comprising an elongated toothed sleeve or gear 6 and a meshing toothed pinion 7 keyed directly on shaft 4a of the spool (FIG. 2). This driving takes place through a variably set torque limiting device 8 which can be adjusted or variably set by tightening a star-shaped nut 9 (FIGS. 1 and 2). The crank arm 5 is disposed exteriorly or outside the flanges 1 as shown in the drawings.

The toothed member 6 is cut at the left hand extremity of a sleeve pivoted at its middle part 6a in a bearing 10 secured in flange 1 and whose right hand extremity 6b has an outer diameter which is less than that of part 6a and defines with this latter a shoulder 6a forming a support for a spring seat 11. This spring 11 cooperates with the elements of the torque limiting device 8 previously mentioned and all the elements are placed in the opening of a bell-shaped housing 5a formed in the crank 5 and entirely disposed exteriorly of the flange 1. These elements are three friction washers or members 12a, 12b, 12c, the first of which 12a can contact the bottom 8a of bell 5a or can take support on a friction washer or member 13d fast on crank 5 and where the others are clamped between steel washers or members 13a, 13b and 13c.

The washers 13a and 13d, comprise one set of bearing members and have an inner diameter which is greater than the outer diameter of part 6b of the elongated toothed member gear 6 while its outer diameter corresponds to that of the opening of the bell; moreover this washer has on its periphery two diametrically opposite projections engaged in corresponding grooves 8b provided on the lateral wall of the bell.

Washers 13b and 13c comprise another set of bearing members and have an outer diameter corresponding to that of the opening of bell 5a and an internal diameter substantially equal to that of part 6b of the sleeve of gear 6. Additionally, these washers 13b and 13c are angularly locked on the sleeve in any suitable manner, for example, by support of a part of their lower edge with a flap in the lateral surface of the sleeve (not shown). The two sets of bearing members are alternately spaced-apart and have interposed between opposed surfaces thereof friction washers 13. The friction washers bear against the bearing members with a force which is determined in accordance with the angular position of the star shaped nut 9, as described hereinafter. The spring seat 11 bears against the stack of washers 12a, 12b, 12c and 13a, 13b, 13c and thus creates between these washers a sufficient frictional effort to kinematically unite gear 6 and crank 5 while one or the other of these members is not subjected to a force which is greater than this frictional force and/or is not angularly blocked.

This frictional force is adjustable as we shall see. In effect, crank 5 in addition to having bell 5a has a projection 5b perforated with a passage 14 which is partially circular and partially with flattened edges 14a by means of which it is mounted on the right part 15a of shaft 15. This part 15a has a cross-section which corresponds to that of passage 14 of projection 15b in such a way that the handle is rotationally integral with shaft 15 while being able to slide axially in the direction F or in the opposite direction. It is precisely this ability of the crank to move which is used to adjust the braking force of the described torque limiting device. The right hand extremity of the part 15a of shaft 15 has threads 15d on which is screwed the star-shaped nut 9 previously mentioned. The nut 9 bears against crank 5 through a washer 16 of self-lubricating material, for example of graphitized polyamide and the threading or turning of the nut effects a translational movement of crank 5 to which spring 11 previously mentioned either opposes or adds to variably set the torque valve where slippage will occur, as described below.

Washer 16 also functions as an insulating member preventing to a great measure the passage of the heat accumulated in the crank, owing to the operation of the couple limiting device, toward nut 9. In this manner, the temperature of the nut even after repeated and long lasting stresses on the torque limiting device will remain relatively low and in any case sufficiently low so as not to interfere with the fisherman when he seeks to manipulate the nut.

To maintain nut 9 in a given angular position, the reel according to the invention provides for the use of a screw 9a which serves as a stop.

The gear 6 already described is threaded and carried by its axial opening 6c on the shoulders 15b of shaft 15 which is rotatably supported at its left-hand extremity 15c in an opening 17a of a plate 17 integral with the flange 1. Between these parts 15b and 15c, shaft 15 carries a toothed ratchet wheel 18a which meshes with a pawl 18b which allows rotation of the shaft carrying crank 5 only in one direction.

Between the ratchet wheel 18a of the pawl and ratchet mechanism and gear 6 is positioned a rotary ball bearing assembly 19 functioning as a stop member and allowing free rotation of this gear 6 relative to the ratchet wheel 18a even when gear 6 is subjected to an axial force generated by the torque limiting device 8.

As described, the star-shaped nut 9 allows the fisherman to selectively adjust the tightening of the elements of the variably settable torque limiting device 8 in such a way that the kinematic link between crank 5 and toothed gear 6 ceases as soon as the parts are subjected to a difference in torque which is greater than a given value, for example C.

Consequently, if the fisherman actuates the crank 5 in a direction contrary to that of the blocking action ensured by pawl 18b, corresponding to the winding of the line on the spool of the reel, this spool will turn if the fishing line is subjected to a pull which is less than that necessary to generate on gear 6 a torque greater than C. In this case, it is the entire assembly of the crank 5, shaft 15, limiting device 8, and gear 6, which turns as a whole.

If this retrieval takes place while the fishing line is the object of a pull which translates itself on gear 6 to a resistance torque which is greater than C, the frictional linkage between spool 5 and gear 6 no longer takes place and there will be slipping of one element relative to the other.

Finally, if the fishing line is the object of an exaggerated pull such that the torque engendered on gear 6 becomes greater than C, while the crank is not actuated, gear 6 will rotate relative to crank 5 and its shaft 15 since these two members are locked angularly by the toothed wheel and pawl 18a, 18b.

In a modification, it is possible to design a torque limiting device which is integrated in a cartridge 20 such that the entire device is removable and replaceable as an integral unit. The small collar 20a of this cartridge 20 bears against the edge surface of bell 5a while its shoulder 20d bears against a surface portion of the sleeve 6a. Owing to this, the cartridge 20, for example made of plastic material, guarantees watertightness and locates only when the torque limiting device operates.

Cartridge 20 comprises washers 13c and 13b which become integral with gear 16 as well as washers 13a and 13d whose projections emerge from two slots 20b in order to engage grooves 8b and 8c. Intermediate washers 12a, 12b, 12c, are disposed between the previous mentioned washers. A ring 20c in cartridge 20 ensures maintenance of the assembly.

The reel which has just been described has the following advantages as compared with known reels:

It will be first noted that the shaft of the crank transmits torsional or twisting effects to which it is subjected through the crank directly on toothed gear 6 which distributes them on bearing 10 which is relatively large.

The elements of the torque limiting device are outside flange 1 in such a way that shaft 15 and gear 6 can be made particularly large.

The outward disposition of the torque limiting device allows for immediate access in these elements in such a way that the fisherman can himself and very readily proceed to replacing the entire friction washers of the torque limiting device, for example:

The interposition of an insulating joint between the star-shaped handling nut of the limiting device and the crank allows for substantial reduction in the heating of this nut and therefore an imposed and finer operation of the torque limiting device.

The assembly of the mechanism, and particularly that of the crank shaft no longer requires riveting and is achieved only by fitting or screwing operations.

The integration of the torque limiting device in a cartridge makes possible to effect the rapid changing thereof of ensuring the correct stacking of the friction washers and to interchange torque limiting devices which have different characteristics.

What I claim and desire to secure by letters patent is:

1. A fishing reel comprising: a pair of spaced-apart and connected together flanges; a spool rotatably mounted between said flanges; a rotatably mounted crank projecting outwardly from one of said flanges; a gear system interconnecting said crank and said spool operative to effect rotation of said spool in response to rotational movement of said crank, said gear system including at least one set of toothed members in meshing engagement and wherein one of said toothed members comprises an elongated member having means therein defining a longitudinally extending throughbore; a shaft disposed within said throughbore; means mounting said shaft within said throughbore for both rotational movement integral with said crank and relative to said elongated member and translational movement relative to said crank; a pawl and ratchet mechanism including a toothed ratchet wheel connected to an end of said shaft operative to prevent rotation of said crank in one direction; means defining a housing in said crank entirely disposed exteriorly of said one flange and receiving therethrough a portion of said shaft; a torque limiting device positioned within said housing frictionally connecting said crank to said elongated member; and means for effecting translational movement of said crank relative to said shaft to selectively adjust the frictional force between said crank and elongated member.

2. A fishing reel according to claim 1; wherein said torque limiting device comprises a peripheral surface portion of said elongated member comprising a first bearing surface, a surface portion of said housing comprising a second bearing surface, and a series of friction washers disposed between said first and second bearing surfaces in frictional engagement therewith.

3. A fishing reel according to claim 1; wherein said means mounting said shaft within said throughbore for rotational movement relative to said elongated member includes a rotary bearing assembly positioned peripherally around said shaft and within said throughbore and cooperative with said shaft to prevent axial translation of said elongated member.

4. A fishing reel according to claim 1; wherein said torque limiting device comprises a series of friction washers positioned in opposed serial relationship within a cartridge, and means removably mounting said cartridge within said housing.

5. A fishing reel according to claim 1; wherein said means for effecting translational movement of said crank comprises a threaded member threaded into one end portion of said shaft effectively connecting said crank to said shaft, and a thermally insulating packing disposed between said threaded member and crank.

6. A fishing reel comprising: a pair of flanges; a spool rotatably mounted between said flanges; drive means for effecting rotational movement of said spool in a given direction including a rotatably mounted crank arm disposed exteriorly of one of said flanges and having means therein defining a housing, a shaft slidable relative to said crank arm and rotationally rigid therewith, and variably set torque limiting means disposed within said housing operative to effect rotation of said spool in response to manual rotational movement of said crank arm in one direction whenever said spool is subjected to a torque tending to rotate same in a direction opposite to said given direction less than a preset torque value and allowing rotation of said spool in said opposite direction relative to said crank arm when said spool is subjected to a torque tending to rotate same in said opposite direction greater than said preset torque value; and means for preventing rotation of said crank arm in the other direction comprising a toothed wheel connected to said shaft and a pawl cooperative with said toothed wheel to prevent rotation of said crank arm in said other direction, a toothed sleeve rotatably mounted directly on a portion of said shaft, gear means interconnecting said toothed sleeve and said spool for transmitting rotational movement of said toothed sleeve to said spool and vice versa, and means for selectively sliding said shaft relative to said crank arm to variably set said preset torque value; and wherein said variably set torque limiting means comprises a first set of members connected to said toothed sleeve and spaced axially therealong, a second set of members connected to the surface of said housing in an axially spaced-apart relationship and individually positioned between respective ones of said members of said first set, and a plurality of friction members disposed between opposed surfaces of adjacent members of said first and second sets and cooperative therewith to define said preset torque value.

7. A fishing reel according to claim 6; further comprising means removably mounting said variably set torque limiting means in said housing for removal therefrom and replacement therein as an integral unit.

8. A fishing reel according to claim 7; wherein said last-mentioned means comprises a cartridge having surfaces frictionally engaged with surface portions of both said toothed sleeve and said crank arm.

9. A fishing reel according to claim 6; including means removably mounting said variably set torque limiting means in said housing for removal therefrom and replacement therein as an integral unit.

* * * * *